United States Patent
Hofacker et al.

(10) Patent No.: US 6,756,464 B2
(45) Date of Patent: Jun. 29, 2004

(54) TWO-COMPONENT POLYURETHANE BINDERS AS PRIMERS

(75) Inventors: Steffen Hofacker, Butzbach (DE); Markus Mechtel, Köln (DE); Wieland Hovestadt, Leichlingen (DE); Claus Kobusch, Shanghai (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/054,386

(22) Filed: Jan. 22, 2002

(65) Prior Publication Data

US 2002/0142169 A1 Oct. 3, 2002

(30) Foreign Application Priority Data

Jan. 24, 2001 (DE) .......................................... 101 03 027

(51) Int. Cl.[7] .............................................. C08G 18/30
(52) U.S. Cl. .............................. 528/27; 528/28; 528/38; 528/49; 528/73; 428/423.1
(58) Field of Search .............................. 528/27, 38, 28, 528/49, 73

(56) References Cited

U.S. PATENT DOCUMENTS

| | | |
|---|---|---|
| 3,856,756 A | 12/1974 | Wagner et al. ............. 260/77.5 |
| 3,979,344 A | 9/1976 | Bryant et al. ............ 260/18 TN |
| 4,255,569 A | 3/1981 | Muller et al. ................ 544/193 |
| 4,292,350 A * | 9/1981 | Kubitza et al. |
| 4,315,091 A | 2/1982 | Steinberger et al. .......... 528/28 |
| 4,409,266 A * | 10/1983 | Wieczorrek et al. |
| 4,474,933 A | 10/1984 | Huber et al. .................. 528/26 |
| 4,625,012 A | 11/1986 | Rizk et al. ..................... 528/28 |
| 4,837,359 A | 6/1989 | Woynar et al. ............. 560/335 |
| 4,960,848 A | 10/1990 | Scholl et al. .................. 528/48 |
| 4,994,541 A | 2/1991 | Dell et al. ..................... 528/51 |
| 5,064,960 A | 11/1991 | Pedain et al. ............... 544/222 |
| 5,076,958 A | 12/1991 | Pedain et al. ............ 252/182.2 |
| 5,109,057 A | 4/1992 | Tsuno et al. ................ 524/588 |
| 5,424,132 A | 6/1995 | Bobrich et al. .......... 428/425.9 |
| 5,677,410 A | 10/1997 | Mager et al. ................. 528/15 |
| 5,679,755 A | 10/1997 | Mager et al. ................. 528/35 |
| 5,700,868 A * | 12/1997 | Hanada |
| 5,854,338 A | 12/1998 | Hovestadt et al. .......... 524/591 |
| 5,880,305 A | 3/1999 | Kraus et al. ................ 556/459 |
| 5,914,383 A | 6/1999 | Richter et al. ................ 528/59 |
| 6,005,131 A | 12/1999 | Jentsch et al. .............. 556/434 |
| 6,008,285 A | 12/1999 | Kasemann et al. .......... 524/430 |
| 6,228,921 B1 | 5/2001 | Kasemann et al. ......... 524/381 |
| 6,395,826 B1 | 5/2002 | Mager et al. ................ 524/858 |
| 2002/0068793 A1 | 6/2002 | Mager et al. ................ 524/858 |

FOREIGN PATENT DOCUMENTS

| | | |
|---|---|---|
| CA | 2 056 751 | 6/2002 |
| DE | 198 18 998 A1 | 11/1999 |
| EP | 0 263 428 B2 | 7/1997 |
| EP | 0 842 991 A1 | 5/1998 |
| GB | 1 244 416 | 9/1971 |
| GB | 1 458 564 | 12/1976 |
| JP | 62250021 | * 10/1987 |
| JP | 04239537 | * 8/1992 |
| WO | 0198393 | * 12/2001 |

OTHER PUBLICATIONS

Abstr. 23 Annual Conference in Organic Coatings (month unavailable) 1997, pp. 271–279 Highly.
Durable Coatings for Augomotive Polycarbonate Glazing D. Kasamberis, K. Browall, C. Iacovangelo, M. Neumann and H. Morgner.
J. Prakt. Chem. 336 (month unavailable) 1994 pp. 185–200 Zur Synthese aliphatischer Polyisocyanurate–Lackpolyisocyanate mit biuret–, Isocyanurate–oder uretdionstruktur, Hans Josef Laas, Reinhard Halpaap und Josef Pedain.
Journal of Sol–Gel Science and Technology 11, pgs. 153–159 (month unavailable) 1998 UV Curable Hard Transparent Hybrid Coatings Materials on Polycarbonate Prepared by the Sol–Gel Method, J. Gilberts and A. H. A. Tinnemans.
Polymer 41 (month unavailable) 2000, pp. 57–71 Preparation and characterization of alkoxysilane functionalized isocyanurates, H. Ni, D.J. Aaserud, W. J. Simonsick Jr., M.D. Soucek.

* cited by examiner

Primary Examiner—Rachel Gorr
(74) Attorney, Agent, or Firm—Joseph C. Gll; Thomas W. Roy; Gary F. Matz

(57) ABSTRACT

The invention relates to a primer containing a solvent-containing two-component polyurethane binder comprising I) a curing component (A), comprising an addition product of at least one organic polyisocyanate (B) with an average NCO functionality of 2.5 to 5.0 and an isocyanate content of 8 to 27 wt. % and an alkoxysilane (C) of formula (I) with at least one isocyanate-reactive group, $$Q-Z-SiX_aY_{3-a} \qquad (I),$$

in which Q represents an isocyanate-reactive group,
  Z represents a linear or branched $C_1-C_{12}$ alkylene group,
  X represents a hydrolyzable group,
  Y represents identical or different $C_1-C_4$ alkyl groups and
  a is an integer from 1 to 3, and
II) a lacquer resin (D) which can react with isocyanate groups as adhesion promoter.

13 Claims, No Drawings

TWO-COMPONENT POLYURETHANE BINDERS AS PRIMERS

BACKGROUND OF THE INVENTION

The invention relates to a primer containing a solvent-containing two-component polyurethane binder, which can be applied to a substrate to which an inorganic or organic coating or an inorganic/organic hybrid coating can be subsequently applied.

Polymeric substrates such as plastics are extremely versatile materials with a number of desirable properties. However, a disadvantage of these materials is, for example, their sensitivity to mechanical damage at the surface or to chemicals such as solvents.

One method of protecting the surface of plastics from such damage comprises the application of a suitable coating to the plastics substrate. The composition of the coating primarily depends on whether the surface is intended to be protected from mechanical damage, radiation, the effects of chemicals or other environmental factors (soiling, etc.). Transparent plastics, such as polycarbonate, are particularly sensitive to mechanical-damage on the surface. Therefore, numerous coating materials have been disclosed which effectively protect in particular polycarbonates from mechanical damage. These are substantially organic modified inorganic coatings which usually cure by condensation or UV. Examples can be found in J. Sol-Gel Sci. Techn. 1998, 11, 153–159, Abstr. 23rd Annual Conference in Organic Coatings, 1997, 271–279, EP-A 0 263 428, DE-A 29 14 427 and DE-A 43 38 361.

The application of these inorganic coatings, however, is often associated with the problem that the adhesion between the plastics material and the coating is inadequate. A number of methods for obtaining adequate adhesion have been described in the prior art. Physical methods include plasma or corona treatment and a suitable chemical method could be the use of a primer.

Many primers react with both the plastics surface and with the coating and (covalent) chemical bonds are formed. In the case of polycarbonates as substrate aminosilanes such as aminopropyltri-alkoxysilanes (like in DE-A 19 858 998) are used. Here, the amino group reacts with the polycarbonate surface and the alkoxysilyl group reacts with the organic modified silicon-containing inorganic coating. However, these N—H-functional primers have the disadvantage that the polycarbonate can be badly damaged by the basic nitrogen function and this damage becomes noticeable, optically, due to an obvious yellow discoloration. Another disadvantage is that the adhesion of inorganic/organic hybrid coatings is rapidly reduced during aging in the presence of water, in particular warm water. For example, the film becomes cloudy, blisters develop and finally the film can separate from the substrate altogether.

It is an object of the present invention to provide a primer for silicon-containing coatings on polymer substrates which enables good adhesion between the organic modified silicon-containing inorganic coating and the surface of the polymer substrate and which does not lead either to optical damage or to instability in the presence of water.

It has now been found that solvent-containing two-component polyurethane binders which contain a curing component containing of an addition product of a polyisocyanate and an alkoxysilane and a lacquer resin which can react with isocyanate groups can be used as primers. These solvent-containing two-component systems represent an ideal combination of very high adhesion between for example a polymer substrate and an inorganic coating and very good weather resistance.

SUMMARY OF THE INVENTION

The invention relates to a primer containing a solvent-containing two-component polyurethane binder containing I. a curing component (A), containing an addition product of at least one organic polyisocyanate (B) with an average NCO functionality of 2.5 to 5.0 and an isocyanate content of 8 to 27 wt. % and an alkoxysilane (C) of formula (I) with at least one isocyanate-reactive group, $$Q—Z—SiX_aY_{3-a} \qquad (I),$$

in which
Q represents an isocyanate-reactive group,
Z represents a linear or branched $C_1$–$C_{12}$ alkylene group,
X represents a hydrolyzable group,
Y represents identical or different $C_1$–$C_4$ alkyl groups and
a is an integer from 1 to 3, and II. a lacquer resin (D) which can react with isocyanate groups as adhesion promoter.

DETAILED DESCRIPTION OF THE INVENTION

Suitable addition products include the reaction products between polyisocyanates and aminosilanes known from the prior art. Such moisture-curing alkoxysilane-terminated polyurethanes are used in plastic-elastic sealing and adhesive compositions which cure at room temperature (U.S. Pat. Nos. 5,700,868, 4,625,012, 4,474,933, 3,979,344, DE-A 4 234 325, DE-A 2 155 259).

Furthermore, the use of a reaction product of HDI isocyanurate and 3-aminopropyl-triethoxysilane as an improved coating system for aircraft is described by H. Ni et al. in "Polymer 41 (2000), p. 57–71".

U.S. Pat. No. 5,854,338 discloses a binder combination for water-dilutable two-component polyurethane coatings which consists of an aqueous hydroxy and/or amino-functional acrylate dispersion and a curing component which contains isocyanate and alkoxysilyl groups in a specific ratio. The alkoxysilyl groups are produced by reaction of an unmodified polyisocyanate with appropriate amino-functional alkoxysilyl compounds. Due to incorporation of the alkoxysilyl compounds in the curing component, two-component polyurethane coatings with improved properties with regard to hardness, acid-resistance or adhesion can be obtained.

The present invention also relates to a primer containing a solvent-containing two-component polyurethane (2K PUR) binder containing 1. a curing component (A), containing an addition product of at least one organic polyisocyanate (B) with an average NCO functionality of 2.5 to 5.0 and an isocyanate content of 8 to 27 wt. % and
an alkoxysilane (C) of formula (I) with at least one isocyanate-reactive group, $$Q—Z—SiX_aY_{3-a} \qquad (I),$$

in which
Q represents a group which can react with isocyanate groups, preferably OH, SH or $NHR_1$, wherein $R_1$ represents a $C_1$–$C_{12}$ alkyl group or a $C_6$–$C_{20}$ aryl group or —Z—SiX$_a$Y$_{3-a}$, Z represents a linear or branched $C_1$–$C_{12}$ alkylene group, preferably a linear or branched $C_1$–$C_4$ alkylene group, X represents a hydrolyzable group, preferably a $C_1$–$C_4$ alkoxy group, Y represents identical or different $C_1$–$C_4$ alkyl groups and a is an integer from 1 to 3 and 2. a lacquer resin (D) which can react with isocyanate groups.

The ratio of isocyanate-reactive groups in the lacquer resin (D) to isocyanate groups in the curing component (A) is between 0.5:1 and 2:1, preferably between 0.7:1 and 1.3:1.

The polyisocyanate (B) preferably has an average NCO functionality of 2.3 to 4.5 and preferably has an isocyanate group content of 11.0 to 24.0 wt. %. The concentration of monomeric diisocyanates is less than 1 wt. %, preferably less than 0.5 wt. %.

Polyisocyanate (B) is selected from at least one organic polyisocyanate with aliphatically, cycloaliphatically, araliphatically and/or aromatically bonded isocyanate groups.

Suitable polyisocyanates or polyisocyanate mixtures (B) include any polyisocyanates, prepared from at least two diisocyanates, with a uretdione, isocyanurate, allophanate, biuret, iminooxadiazinedione and/or oxadiazinetrione structure. Preferred diisocyanates are simple aliphatic, cycloaliphatic, araliphatic and/or aromatic diisocyanates, such as are described, for example in J. Prakt. Chem. 336 (1994) 185–200 and in DE-A 16 70 666, DE-A 19 54 093, DE-A 24 14 413, DE-A 24 52 532, DE-A 26 41 380, DE-A 37 00 209, DE-A 39 00 053 and DE-A 39 28 503 or in EP-A 336 205, EP-A 339 396 and EP-A 798 299.

Suitable diisocyanates for preparing such polyisocyanates are any diisocyanates with molecular weights in the range of 140 to 400, obtainable by phosgenation or by a phosgene-free process, for example by thermal urethane decomposition, and which contain aliphatically, cycloaliphatically, araliphatically and/or aromatically bonded isocyanate groups such as 1,4-diisocyanatobutane, 1,6-diisocyantohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanato-cyclohexane, 1,3- and 1,4-bis-(isocyanatomethyl)-cyclohexane, 1-isocyanato-3,3,5-trimethyl-5-isocyantomethylcyclohexane (isophorone diisocyanate, IPDI), 4,4'-diisocyanatodicyclohexylmethane, 1-isocyanato-1-methyl-4(3)-isocyanato-methyl-cyclohexane, bis-(isocyanatomethyl)-norbornane, 1,3- and 1,4-bis-(1-isocyanato-1-methylethyl)-benzene (TMXDI), 2,4- and 2,6-diisocyanatotoluene (TDI), 2,4'- and 4,4'-diisocyanatodiphenylmethane (MDI), 1,5-diisocyanatonaphthalene or any mixture of such diisocyanates.

Starting polyisocyanates (B) have preferably exclusively aliphatically and/or cycloaliphatically bonded isocyanate groups.

More preferred starting polyisocyanates (B) are polyisocyanates and polyisocyanate mixtures with a biuret or isocyanurate structure based on HDI, IPDI and/or 4,4'-diisocyanatodicyclohexylmethane.

Suitable alkoxysilanes (C) of formula (I) with functional groups which can react with isocyanate groups include hydroxymethyl-tri(m)ethoxysilane and alkoxysilyl compounds with secondary amine groups or mercapto groups.

Examples of secondary aminoalkoxysilanes are N-methyl-3-aminopropyltri(m)ethoxysilane, N-phenyl-3-aminopropyltrimethoxysilane, bis-(gamma-trimethoxysilylpropyl)amine, N-butyl-3-aminopropyltri(m) ethoxysilane, N-ethyl-3-aminoisobutyltri(m)ethoxysilane or N-ethyl-3-aminoisobutylmethyl-di(m)ethoxysilane and the analogous $C_2$–$C_4$ alkoxy silanes.

Alkoxysilanes (C) which are also suitable in the context of the invention are amino-functional alkoxysilyl compounds which are obtained in accordance with the disclosure in U.S. Pat. No. 5,364,955 by the reaction of aminosilanes of formula (I), in which $R_1$=H, with maleates or fumarates of formula (II)

$$R_2OOC-CH=CH-COOR_3 \qquad (II),$$

in which $R_2$ and $R_3$ represent identical or different (cyclo)alkyl groups with 1 to 8 carbon atoms.

Preferred compounds of formula (II) are dimethyl maleate and diethyl maleate.

Further examples of alkoxysilanes (C) of formula (I) are 3-mercaptopropyltrimethoxysilane and 3-mercaptopropyltriethyoxysilane.

Preferred alkoxysilanes (C) are N-butyl-3-aminopropyltri(m)ethoxy-silane and 3-mercaptopropyltri(m)ethoxysilane.

To prepare the curing component (A) mixtures of alkoxysilanes (C) of formula (I) may also be employed. By way of example, mixtures of alkoxysilanes (C) which contain the same functional groups Q which can react with isocyanate groups, but different hydrolyzable groups X, are possible. Mixtures which contain alkoxysilanes (C) of formula (I) with different functional groups Q are also suitable.

Polyisocyanate component (B) is modified with alkoxysilanes (C) in a NCO/Q molar ratio of 1:0.01 to 0.75, preferably in a NCO/Q molar ratio of 1:0.05 to 0.4.

In principle, it is also possible to react polyisocyanates in a higher molar ratio, or even completely, i.e. in accordance with an NCO/Q ratio of up to 1:1, with the amino-functional alkoxysilyl compounds (Q=NH).

Suitable lacquer resins (D) which can react with isocyanate groups include polyhydroxyl compounds such as, tri- and/or tetrafunctional alcohols and/or conventional polyetherpolyols, polyesterpolyols, polycarbonatepolyols and/or polyacrylatepolyols.

Lacquer binders or lacquer binder components with isocyanate-reactive groups, other than hydroxyl groups, are also suitable as reaction partners (D) for the curing component (A). These include polyurethanes or polyureas which can be cross-linked with polyisocyanates due to the active hydrogen atoms present in the urethane or urea groups. Suitable reaction partners (D) also include polyamines in which the amine groups are blocked, such as polyketimines, polyaldimines or oxazolanes, from which free amine groups, and in the case of oxazolanes free hydroxyl groups, can be produced under the effects of moisture, and these can react with the polyisocyanate mixtures. Preferred lacquer resins (D) are polyacrylate polyols and polyester polyols.

The polyisocyanate and/or binder components are generally employed in a form diluted with solvents in the solvent-containing 2-component PUR binders. These solvents include butyl acetate, ethyl acetate, 1-methoxy-2-propyl acetate, toluene, 2-butanone, xylene, 1,4-dioxan, diacetone alcohol, N-methylpyrrolidone, dimethylacetamide, dimethylformamide, dimethylsulfoxide or any mixture of such solvents. Preferred solvents are butyl acetate, ethyl acetate and diacetoalcohol.

The conventional auxiliary substances of coating technology may optionally be added to the solvent-containing 2-component PUR binders for use in accordance with the invention. Conventional auxiliary substances include any additives already disclosed for the preparation of lacquers and colorants such as inorganic or organic pigments, light stabilizers, lacquer additives such as dispersants, flow control agents, thickeners, defoaming agents and other auxiliary substances, adhesives, fungicides, bactericides, stabilizers or inhibitors and catalysts. It is possible to add several of the auxiliary substances mentioned.

Application of the primer containing the 2-component PUR binder to a substrate can be achieved using application processes which are conventionally used in coating technology such as spraying, flow coating, dipping, centrifugal casting or applying with a knife.

Suitable substrates according to the invention are, for example, polymer substrates such as ABS, polyamide or polyurethane, metals, which may optionally have an organic coating, or glass.

The primer is especially suitable for transparent polymer substrates, for example for thermoplastic polymers such as polycarbonates, polymethylmethacrylates, polystyrene, polyvinylcyclohexane and copolymers of these or polyvinyl chloride or blends thereof.

Inorganic coatings such as purely inorganic lacquer systems or else organic modified inorganic lacquer systems or else also layers deposited by a plasma process (like $Al_2O_3$, $TiO_2$, $SiO_x$, TiC, etc.) may be applied to substrates coated with the primer.

Purely inorganic lacquer systems include those coatings prepared by the sol-gel process which are built up from monomeric units which do not contain any organic groups which could remain as constituents of the network, given their presence and the completion of an ideal network.

These types of monomeric units include tetraalkoxysilanes such as tetra(m)ethoxysilane or metal alkoxides such as aluminium, titanium or zirconium alkoxide.

Furthermore, such inorganic lacquer systems may naturally also contain inorganic filler particles like $SiO_2$, $Al_2O_3$ or AlOOH.

Organic modified inorganic lacquer systems include those coatings prepared by the sol-gel process which are built up from monomeric units which contain organic groups which remain as constituents of the network being formed. These organic groups may be functional or non-functional.

Monomeric units with non-functional organic groups include alkylalkoxysilanes such as methyltri(m)ethoxysilane, arylalkoxysilanes or phenyltri(m)ethoxysilane, or also carbosilane compounds such as are described e.g. in U.S. Pat. Nos 5,679,755, 5,677,410, 6,005,131, 5,880,305 or in EP-A 947 520.

Suitable monomeric units with functional organic groups include vinyl, acrylic or else also methacrylic group-containing alkoxysilanes such as vinyltri(m)ethoxysilane, acryloxypropyltri(m)ethoxysilane, methacryloxy-propyltri(m)ethoxysilane, and also epoxy-functional alkoxysilanes, for example glycidyloxypropyltri(m)ethoxysilane, or also NCO-functional alkoxysilanes such as 3-isocyanatopropyltri(m)ethoxysilane.

With this type of monomeric unit it is possible, inter alia, to build up a transversely cross-linking organic polymer system in addition to the existing inorganic network, or the inorganic network being formed.

Functional organic groups include those which are not necessarily used for the construction of an organic transversely cross-linking system such as halogens, acid groups, alcohol or thiol groups. Polyurethane melamine crosslinking systems or also alkyd resin lacquer systems, for example, are suitable for use as organic coatings.

Inorganic/organic hybrid coatings are also preferred in addition to inorganic coatings. These are characterised in that they have both an organic polymer system and also an inorganic polymer system available and that these are present alongside each other or linked together.

Possible inorganic/organic hybrid coatings include those in which an organic polymer matrix is modified by the addition or incorporation of inorganic units. Inorganic units include silica sol dispersions in water or in organic solvents and/or hydrolysates of (organofunctional) alkoxysilanes.

Particularly good resistance to abrasion and resistance to scratching and also very good resistance to solvents is achieved when lacquer systems based on organofunctional alkoxysilanes and/or siloxanes are applied to the polymeric substrate coated with the primer of the invention. A generally known process for preparing such lacquer binders is the sol-gel process as described in detail by C. J. Brinker and W. Scherer in "Sol-Gel Science: The Physics and Chemistry of Sol-Gel Processing", Academic Press, New York (1990). Suitable sol-gel lacquers with high resistance to mechanical stress are known from the prior art and are described, for example, in U.S. Pat. Nos. 4,624,870, 3,986,997, 4,027,073, EP-A 358 011, U.S. Pat. No. 4,324,712, WO 98/52992, WO 94/06807, U.S. Pat. No. 6,005,131 and EP-A 947 520. Hydrophobic and/or oleophobic inorganic/organic hybrid coatings with antiadhesion and/or antigraffiti characteristics are described, for example, in DE-A 41 18 184, WO 99/03941 and EP-A 967 253.

Polymeric substrates may thus be effectively protected from mechanical damage and/or from environmental factors such as UV light and/or soiling.

For example, a polycarbonate sheet which is coated with the primer of the invention and an organic modified inorganic coating prepared in accordance with the disclosure in EP-A 947 520 (example 14) is effectively protected from mechanical damage and from radiation damage. The protective effect is still fully present even after intensive weathering. A polycarbonate sheet coated with the coating structure described above can be subjected to fully deionised water for several days without any loss in adhesion or any optical change being detectable. After 1000 hours of weathering in a UV-A test with an intensity of 1.35 $W/m^2$ (ASTM G 154-97, cycle 4), no optical change is observed in the substrate or the primer or the inorganic coating.

Drying and curing of the 2-component PUR binder for use in accordance with the invention may be performed between ambient temperature and the softening point of the polymeric substrate. For example, with polycarbonate as the substrate the curing temperature range is preferably between 20° C. and 130° C. (Makrolon, Bayer AG, Leverkusen, or Lexan, GE Plastics, USA) or 20 to 160° C. for Apec HT (Bayer AG, Leverkusen) with a curing time between 1 minute and 60 minutes. The curing temperature range for Makrolon is more preferably between 100° C. and 130° C. and for Apec HT is between 100° C. and 160° C., with a curing time between 30 minutes and 60 minutes.

The application and curing conditions for the inorganic coatings depend on the particular binder system used. The primer and the organic modified inorganic coating can be applied and cured in sequence. Likewise, a wet-on-wet application is possible, followed by a single curing process in the temperature range and time interval mentioned above.

For special applications, curing at ambient temperature may optionally also be sufficient.

EXAMPLES

In the examples given below, all data relating to percentages are given with respect to weight.

Baysilone OL 17 (Bayer AG, Leverkusen), Tinuvin 292 (Ciba Spezialitätenchemie GmbH, Lampertheim) and/or Tinuvin 1 130 (Ciba Spezialitätenchemie GmbH, Lampertheim) were used as lacquer additives.

Example 1

Diethyl N-(3-trimethoxysilylpropyl)aspartate was prepared in accordance with the disclosure in U.S. Pat. No. 5,364,955, example 5, by reacting equimolar amounts of 3-aminopropyltrimethoxysilane with diethyl maleate.

Example 2

180 g (1 g.eq. NCO) of a 100% solids HDI isocyanurate with a viscosity of 1200 mPas (23° C.), an average NCO content of 23% and an NCO functionality of 3.2 were initially introduced into a standard stirred apparatus. 17.55 g (0.05 mol) diethyl N-(3-trimethoxysilylpropyl)aspartate from example 1 were added dropwise at room temperature with vigorous stirring and then stirring was continued for one hour. The resulting addition product had a NCO content of 20%.

Examples 3 to 20

The same procedure was used as in example 2. Table 1 gives the polyisocyanate and alkoxysilane and the amounts thereof used each time. The NCO content of the addition product produced is given as a percentage.

Polyisocyanate A HDI isocyanurate, 90% solids in butyl acetate with a viscosity of 600 mPas (23° C.), an average NCO content of 19.6%, a NCO functionality of 3.2.
Polyisocyanate B HDI biuret, 75% solids in butyl acetate with a viscosity of 160 mPas (23° C.), an average NCO content of 16.5% and a NCO functionality of 3.8.
Polyisocyanate C IPDI isocyanurate, 70% solids in butyl acetate with a viscosity of 700 mPas (23° C.), an average NCO content of 11.8% and a NCO functionality of 3.2.
Alkoxysilane 1: Diethyl N-(3-trimethoxysilylpropyl) aspartate from example 1
Alkoxysilane 2: N-butyl-3-aminopropyltrimethoxysilane (Dynasilan 1189, Degussa-Hüls AG)
Alkoxysilane 3: Bis-(trimethoxysilylpropyl)amine, (Silquest A-1170, Wite)
Alkoxysilane 4: N-methyl-3-aminopropyltrimethoxysilane, (Dynasilan 1110, Degussa-Hüls AG)
Alkoxysilane 5: 3-mercaptopropyltrimethoxysilane, (Dynasilan NTNS, Degussa-Hüls AG)

TABLE 1

| | Examples 3 to 20 | | | | |
|---|---|---|---|---|---|
| Example | Polyiso-cyanate | Initial weight [g] | Alkoxy-silane | Initial weight [g] | NCO content [%] | Note *1 |
| 3 | A | 216 | 1 | 17.55 | 17.1 | — |
| 4 | B | 255 | 1 | 17.55 | 14.7 | — |
| 5 | C | 178 | 1 | 8.78 | 10.7 | — |
| 6 | B | 50 | 1 | 0.7 | 16.1 | — |
| 7 | B | 50 | 1 | 13.8 | 10.3 | — |
| 8 | B | 100 | 5 | 4.7 | 14.9 | |
| 9 | B | 100 | 5 | 9.4 | 13.5 | |
| 10 | B | 100 | 5 | 18.7 | 11.1 | |
| 11 | B | 100 | 5 | 46.7 | 5.9 | 60% in BA |
| 12 | C | 100 | 2 | 3.29 | 10.8 | |
| 13 | C | 100 | 2 | 6.5 | 9.8 | |
| 14 | C | 100 | 2 | 13.1 | 8.3 | |
| 15 | C | 100 | 2 | 32.6 | 3.5 | 60% in BA |
| 16 | B | 50 | 2 | 2.3 | 14.9 | |
| 17 | B | 50 | 4 | 1.89 | 15.0 | |
| 18 | B | 100 | 3 | 6.69 | 14.7 | |
| 19 | C | 100 | 5 | 3.34 | 10.8 | |
| 20 | B | 100 | 1 | 103.23 | 1.8 | 70% in BA |

*1 SC: Solids content in wt. %; BA: Butyl acetate

Polyols and auxiliary substances suitable for 2-component PUR binders for use in accordance with the invention are given in table 2. Components B1 to B5 are prepared by adding the individual components listed in table 2 in any sequence and then thoroughly mixing at room temperature.

Polyol 1; Trimethylolpropane
Polyol 2: Desmophene® 670 (Bayer AG, Leverkusen), which represents a slightly branched, hydroxyl group-containing polyester, 80% solids in BA with a hydroxyl content of 3.5%, an acid value of 2 mg KOH/g and a viscosity of 2800 mPas (23° C.)
Polyol 3: Desmophen® 800 (Bayer AG, Leverkusen) which represent a highly branched, hydroxyl group-containing polyester, solvent-free with a hydroxyl content of 8.6%, an acid value of 4 mg KOH/g and a viscosity of 850 mPas (23° C., 70% MPA)
Polyol 4: Desmophen® VPLS 2249/1 (Bayer AG, Leverkusen) which represents a branched, short-chain, polyester, solvent-free with a hydroxyl content of 16%, an acid value of 2 mg KOH/g and a viscosity of 1900 mPas (23° C.)
DAA: Diacetone alcohol

TABLE 2

| Polyols and auxiliary substances (according to the invention) | | | | | |
|---|---|---|---|---|---|
| | B1 | B2 | B3 | B4 | B5 |
| Polyol (X) X = 1, 2, 3, 4 | 12.3 g (1) | 15.4 g (2) | 11.6 g (2) 3.1 g (3) | 3.9 g (2) 9.2 g (3) | 12.3 g (4) |
| Butylacetate | 3.1 g | — | 0.8 g | 2.3 g | 3.1 g |
| Baysilone ® OL 17 10% in DAA | 0.2 g | 0.2 g | 0.2 g | 0.2 g | 0.2 g |
| Tinuvin ® 292 10% in DAA | 2.0 g | 2.0 g | 2.0 g | 2.0 g | 2.0 g |
| Tinuvin ® 1130 10% in DAA | 2.0 g | 2.0 g | 2.0 g | 2.0 g | 2.0 g |
| Zinc octoate 10% in DAA | 0.4 g | 0.4 g | 0.4 g | 0.4 g | 0.4 g |

TABLE 2-continued

Polyols and auxiliary substances (according to the invention)

|  | B1 | B2 | B3 | B4 | B5 |
|---|---|---|---|---|---|
| DAA | 170.5 g | 170.5 g | 170.5 g | 170.5 g | 170.5 g |
| Equivalent weight | 692.0 g | 6012.0 g | 4835.0 g | 3521.0 g | 1639.0 g |

Preparing the 2-Component PUR Binder Used as a Primer in Accordance with the Invention (Examples 21 to 27)

A silicon-modified polyisocyanate from table 1 was added to one of the polyol mixtures B1 to B5 from table 2 each time and mixed at room temperature, with a NCO: OH ratio of 1.2:1. The 2-component PUR binder for use in accordance with the invention was ready to be applied. Appropriate combinations of polyol mixtures B1 to B5 and the silicon-modified polyisocyanates from table 1 were possible. Table 3 gives possible combinations produced from table 1 and table 2 which can be used to prepare 2-component PUR binders for use in accordance with the invention.

TABLE 3

2-component PUR binders for use as primers in accordance with the invention

| Example | Polyisocyanate from example | Initial weight [g] | Polyol component | Initial weight [g] |
|---|---|---|---|---|
| 21 | 4 | 5.7 | B2 | 100 |
| 22 | 8 | 48.9 | B1 | 100 |
| 23 | 12 | 7.75 | B2 | 100 |
| 24 | 14 | 37.3 | B5 | 100 |
| 25 | 15 | 30.1 | B3 | 100 |
| 26 | 18 | 21 | B5 | 100 |
| 27 | 12 | 13.2 | B4 | 100 |

Example 28

26.4 g of a 75% solids solution of a hydroxy-functional polyacrylate in xylene with a hydroxyl content of 2.8%, an acid value of 2 mg KOH/g and a viscosity of 3500 mPas (23° C.) and also 0.94 g Baysilone oil OL 17 (10% strength in xylene), 0.35 g DBTL (dibutyltin laurate, 10% strength in xylene) and 25 g xylene were homogeneously blended. 12.5 g of the silicon-modified isocyanate component from example 4 were stirred into this mixture.

Application Examples

The effectiveness of the 2-component PUR binder for use as primer in accordance with the invention was demonstrated using the following examples.

Example 29
Primer for a Hydrophobic/Oleophobic Silicon-Containing Coating

The 2-component PUR binder from example 28 was applied in a dry layer thickness of about 15 μm to a steel sheet coated with a commercially available primer (Sigma Universal Primer 7417, Sigmakalan, Netherlands) and epoxy anticorrosion lacquer (Sigma Multiguard, Sigmakalan, Netherlands) and then dried for 24 hours at room temperature.

An organic modified inorganic lacquer which is composed of 64.6 wt. % of an ethoxy-functional siloxane, prepared in accordance with example 2 from WO 98/52992, 12.9 wt. % of a 50% solids dispersion of a polycondensation product of tetraethoxysilane in n-butanol, 15.5 wt. % of an α,ω-hydroxy-functional polydimethylsiloxane with an OH content of about 6%, 1.3 wt. % of 3-mercaptopropyltriethoxysilane and 5.7 wt. % of an about 2% strength solution of p-toluenesulfonic acid in n-butanol was applied to the primer in a dry layer thickness of about 40 μm and also dried for 24 hours at room temperature.

The resulting protective coating exhibits good adhesion to the polymer substrate. It is weather resistant and offers effective protection from soiling. The coating was not wetted by a permanent marker (Edding 850). The marker could be removed without leaving any residue 24 hours after application by using a cloth without the additional aid of a cleansing agent.

Adhesive Properties of the 2-component PUR Binder for Use as a Primer in Accordance with the Invention on Polycarbonate Example 30

The 2-component PUR binder of example 22 in table 3 was applied by centrifugal casting in a layer thickness of about 0.2 μm to a Makrolon sheet and cured for 60 minutes at 130° C. Then a silicon-containing coating as described in EP-A 0 947 520, example 14, was applied by centrifugal casting in a layer thickness of 3 μm and cured for 60 minutes at 130° C.

Example 31

Same procedure as in example 30. However, the 2-component PUR binder from example 23 in table 3 was applied by centrifugal casting in a layer thickness of about 0.2 μm.

Comparison Example 1

Same procedure as in example 30 and 31. Instead of the 2-component PUR binder, 3-aminopropyltrimethoxysilane, as a known primer from the prior art for use on polycarbonate, was applied by centrifugal casting in a layer thickness of about 0.2 μm.

Comparison Example 2

Same procedure as in example 30 and 31. A non-silicon-modified polyisocyanate was used as cross-linking agent. For this, 100 g of polyol component B2 from table 2 were stirred together with 7.2 g of a 70% solids solution in butyl acetate of an IPDI isocyanurate with an average NCO content of 11.8% and a NCO functionality of 3.2 and a viscosity of 700 mPas (23° C.), with a NCO: OH ratio of 1.2:1, and applied by centrifugal casting in a layer thickness of about 0.2 μm.

Comparison Example 3

Same procedure as in example 30 and 31. A non-silicon-modified polyisocyanate was used as cross-linking agent. For this, 100 g of polyol component B2 from table 2 were stirred together with 5.1 g of a 75% solids solution in butyl acetate of an HDI biuret with an average NCO content of 16.5% and a NCO functionality of 3.8 and a viscosity of 160 mPas (23° C.), with a NCO: OH ratio of 1.2:1, and applied by centrifugal casting in a layer thickness of about 0.2 μm.

The Makrolon sheets coated in accordance with examples 30 and 31 and comparison examples 1 to 3 were tested for adhesion before and after weathering. For this, one sheet from each example was stored in demineralized water for 8 hours at 100° C. Another sample was stored in demineralized water for 14 days at 65° C. Furthermore, one sheet from each example was weathered for 1000 h in accordance with ASTM G 154–97 cycle 4. After weathering, the adhesion was tested using cross-hatch adhesion test DIN EN ISO 2409. The results of the cross-hatch adhesion test after weathering are given in table 4.

TABLE 4

Cross-hatch adhesion test in accordance with DIN EN ISO 2409 after weathering

|  | Example 30 | Example 31 | Comp. Example 1 | Comp. Example 2 | Comp. Example 3 |
|---|---|---|---|---|---|
| Basic adhesion (before weathering) | 0 | 0 | 0 | 5 | 0 |
| Adhesion after 8 h storage in demineralized water at 100° C. | 0 | 0 | 5 | — | 5 |
| Adhesion after 14 d storage in demineralized water at 65° C. | 0 | 0 | 5 | — | 5 |
| Adhesion after 1000 h weathering according to ASTM G 154-97 cycle 4 | 0 | 0 | — | — | — |

Cross-hatch adhesion test characterising values:
No detachment at all (0)
Complete detachment (5)
Not carried out (—)

It can be seen from table 4 that the 2-component PUR binders used as primers in accordance with the invention lead to good adhesion and exceptional weather resistance of organic modified inorganic coatings on polymer substrates such as polycarbonate, polymethylmethacrylate or polyurethane. 3-aminopropyl-trimethoxysilane, a primer known from the prior art for use on polycarbonate, lead to complete detachment when stored in demineralized water. Primers based on polyisocyanates which are not modified in accordance with the invention have either inadequate basic adhesion or exhibit a much lower resistance to weathering/water storage than primers according to the invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An adhesion promoting primer comprising a solvent-containing two-component polyurethane binder comprising
   (A) a curing component consisting of an addition product of (B) at least one organic polyisocyanate with an average NCO functionality of 2.5 to 5.0 and an isocyanate content of 8 to 27 wt. % and (C) an alkoxysilane of formula (I) with at least one isocyanate-reactive group, $$Q-Z-SiX_aY_{3-a} \quad (I),$$

wherein
   Q represents an isocyanate-reactive group,
   Z represents a linear or branched $C_1$–$C_{12}$ alkylene group,
   X represents a hydrolyzable group,
   Y represents identical or different $C_1$–$C_4$ alkyl groups and
   a is an integer from 1 to 3, and
   (D) a lacquer resin which can react with isocyanate groups
   wherein the solvent is selected from diacetone alcohol and mixtures of diacetone alcohol with butyl acetate and/or ethyl acetate.

2. The primer of claim 1 wherein the ratio of isocyanate-reactive groups in lacquer resin (D) to isocyanate groups in curing component (A) is between 0.5:1 and 2:1.

3. The primer of claim 1 wherein polyisocyanate (B) has an average NCO functionality of 2.3 to 4.5 and an isocyanate group content of 11.0 to 24.0 wt. % based on the weight of (B).

4. The primer of claim 1 wherein polyisocyanate (B) comprises a polyisocyanate or a polyisocyanate mixture with exclusively aliphatically and/or cycloaliphatically bonded isocyanate groups.

5. The primer of claim 1 wherein polyIsocyanate (B) comprises a polyisocyanate or a polyisocyanate mixture having at least one biuret or isocyanurate structure based on HDI, IPDI and/or 4,4'-diisocyanatodicyclohexylmethane.

6. The primer of claim 1 wherein NCO/Q molar ratio of polyisocyanate (B) and alkoxysilanes (C) is between 1:0.01 to 0.75.

7. The primer of claim 1 wherein in formula (I)
   Q represents OH, SH or $NHR_1$,
   $R_1$ represents a $C_1$–$C_{12}$ alkyl group or a $C_6$–$C_{20}$ aryl group or —Z—$SiX_aY_{3-a}$,
   Z represents a linear or branched $C_1$–$C_4$ alkyl group, and
   X represents a $C_1$–$C_4$ alkoxy group.

8. A substrate coated with the primer of claim 1.

9. The substrate of claim 8 further comprising another coating as a top-layer.

10. The substrate of claim 8 wherein the substrate comprises a material selected from the group consisting of polymer, metal or glass substrates.

11. The substrate of claim 10 wherein the polymer substrate is selected from the group consisting of polycarbonate, polymethylmethacrylate, polystyrene, polyvinylcyclohexane, polyvinylchloride or blends thereof.

12. The substrate of claim 9 wherein the other coating is selected from the group consisting of inorganic coatings, organic coatings or inorganic/organic hybrid coatings.

13. The substrate of claim 12 wherein the inorganic coating comprises silicon.

* * * * *